US012665948B2

(12) United States Patent
Geary et al.

(10) Patent No.: US 12,665,948 B2
(45) Date of Patent: Jun. 23, 2026

(54) METHOD AND APPARATUS FOR PREVENTING DELAYS IN THE RECEPTION OF STORAGE SYSTEM DATA

(71) Applicant: Dell Products L.P., Round Rock, TX (US)

(72) Inventors: Niall Geary, Ballinlough (IE); Scott Rowlands, Cumming, GA (US); Igor Fradkin, Sharon, MA (US)

(73) Assignee: Dell Products L.P., Round Rock, TX (US)

( * ) Notice: Subject to any disclaimer, the term of this patent is extended or adjusted under 35 U.S.C. 154(b) by 127 days.

(21) Appl. No.: 18/645,933

(22) Filed: Apr. 25, 2024

(65) Prior Publication Data

US 2025/0337807 A1     Oct. 30, 2025

(51) Int. Cl.
*G06F 15/16* (2006.01)
*H04L 67/1097* (2022.01)

(52) U.S. Cl.
CPC ................................ *H04L 67/1097* (2013.01)

(58) Field of Classification Search
CPC .................................................. H04L 67/1097
See application file for complete search history.

(56) References Cited

U.S. PATENT DOCUMENTS

| | | | |
|---|---|---|---|
| 11,513,684 B1 * | 11/2022 | Tylik | G06F 3/0644 |
| 2020/0134049 A1 * | 4/2020 | Bassov | G06F 16/1752 |
| 2023/0049823 A1 * | 2/2023 | Abouelwafa | G06F 3/0605 |
| 2024/0039871 A1 * | 2/2024 | Bharadwaj | H04L 67/1097 |

* cited by examiner

*Primary Examiner* — Yves Dalencourt
(74) *Attorney, Agent, or Firm* — Daly, Crowley, Mofford & Durkee, LLP.

(57) ABSTRACT

A method for use in a storage system including a plurality of storage processors, the method comprising: detecting, by a given one of the plurality of storage processors, a first event that is associated with a communications network, the communications network being arranged to deliver write requests to the storage processor, the first event being an event that signals a disruption or a possible disruption in the operation of the communications network; in response to the first event, transitioning the given storage processor from a first state into a second state, the first state being a state in which data items associated with the write requests are routed to a global memory of the storage system via a first data path, the second state being state in which the data items are routed to the global memory via a second data path.

17 Claims, 4 Drawing Sheets

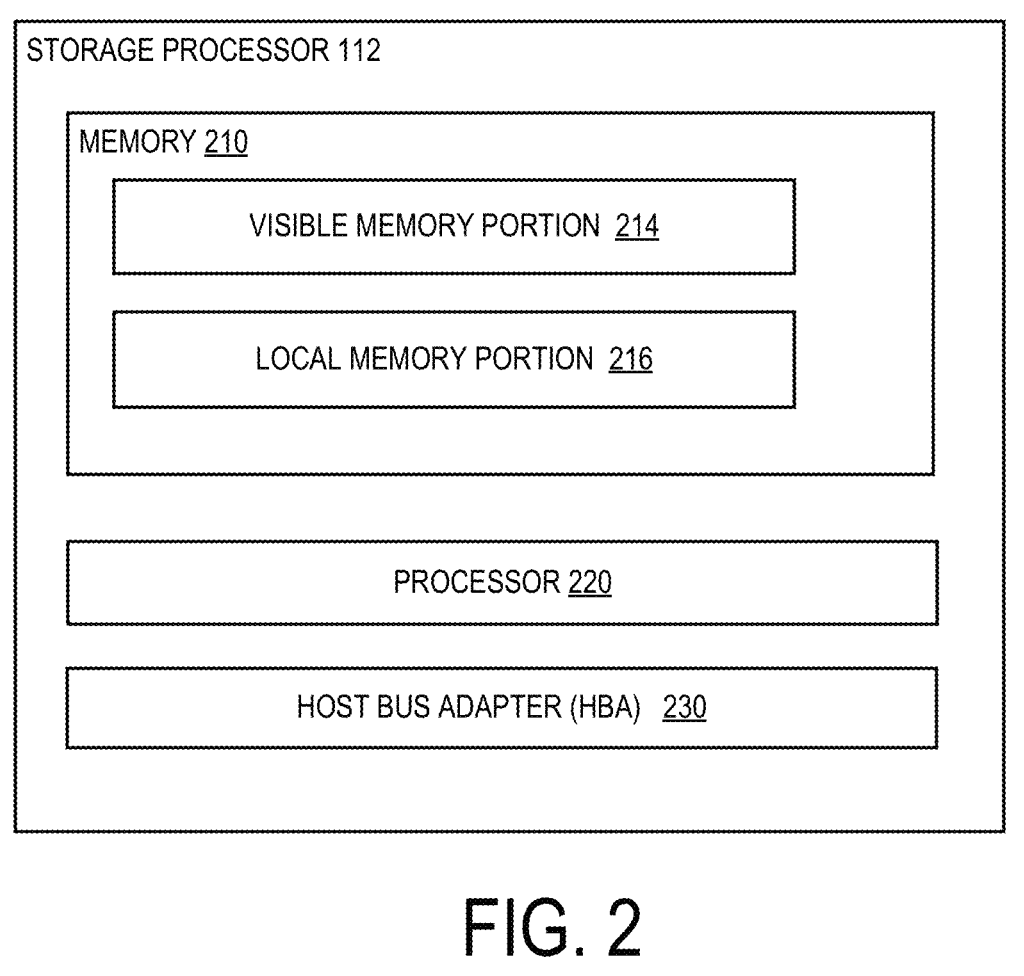

STORAGE PROCESSOR 112

MEMORY 210

VISIBLE MEMORY PORTION  214

LOCAL MEMORY PORTION  216

PROCESSOR 220

HOST BUS ADAPTER (HBA)  230

FIG. 2

ROUTE INCOMING DATA TO A GLOBAL MEMORY BY USING A FIRST DATA PATH THAT DOES NOT PASS THROUGH LOCAL MEMORY
302

A FIRST EVENT THAT IS INDICATIVE OF A NETWORK DISRUPTION

ROUTE INCOMING DATA TO THE GLOBAL MEMORY BY USING A SECOND DATA PATH THAT PASSES THROUGH LOCAL MEMORY
304

A SECOND EVENT

500

502 RECEIVE A DATA ITEM PORTION

504 ROUTE THE DATA ITEM PORTION TO LOCAL MEMORY

506 HAS THE ENTIRE DATA ITEM BEEN RECEIVED?

NO

YES

508 COPY THE DATA ITEM TO GLOBAL MEMORY

510 ACKNOWLEDGE RECEIPT OF THE DATA ITEM

400

402 RECEIVE A DATA ITEM PORTION

404 ROUTE THE DATA ITEM PORTION DIRECTLY TO GLOBAL MEMORY

406 HAS THE ENTIRE DATA ITEM BEEN RECEIVED?

NO

YES

408 ACKNOWLEDGE RECEIPT OF THE DATA ITEM

METHOD AND APPARATUS FOR PREVENTING DELAYS IN THE RECEPTION OF STORAGE SYSTEM DATA

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system including a plurality of storage processors, the method comprising: detecting, by a given one of the plurality of storage processors, a first event that is associated with a communications network, the communications network being arranged to deliver write requests to the storage processor, the first event being an event that signals a disruption or a possible disruption in the operation of the communications network; in response to the first event, transitioning the given storage processor from a first state into a second state, the first state being a state in which data items associated with the write requests are routed to a global memory of the storage system via a first data path, the second state being state in which the data items are routed to the global memory via a second data path, wherein the global memory includes a plurality of global memory portions that are part of a same address space, wherein each global memory portion is implemented using physical memory hardware that is part of a different one of the plurality of storage processors.

According to aspects of the disclosure, a storage processor is provided, comprising: physical memory hardware; and at least one processor that is operatively coupled to the physical memory hardware, the at least one processor being configured to perform the operations of: detecting a first event that is associated with a communications network, the communications network being arranged to deliver write requests to the storage processor, the first event being an event that signals a disruption or a possible disruption in the operation of the communications network; in response to the first event, transitioning the storage processor from a first state into a second state, the first state being a state in which data items associated with the write requests are routed to a global memory of a storage system via a first data path, the second state being a state in which the data items are routed to the global memory via a second data path, wherein the storage processor is part of a plurality of storage processors that constitute the storage system, and wherein the global memory includes a plurality of global memory portions that are part of a same address space, wherein each global memory portion is implemented using physical memory hardware that is part of a different one of the plurality of storage processors.

According to aspects of the disclosure, a non-transitory computer-readable medium is provided that stores one or more processor-executable instructions, which, when executed by a processing circuitry of a given one of a plurality of storage processors in a storage system, causes the processing circuitry to perform the operations of: detecting a first event that is associated with a communications network, the communications network being arranged to deliver write requests to the given storage processor, the first event being an event that signals a disruption or a possible disruption in the operation of the communications network; in response to the first event, transitioning the given storage processor from a first state into a second state, the first state being a state in which data items associated with the write requests are routed to a global memory of the storage system via a first data path, the second state being a state in which the data items are routed to the global memory via a second data path, wherein the global memory includes a plurality of global memory portions that are part of a same address space, wherein each global memory portion is implemented using physical memory hardware that is part of a different one of the plurality of storage processors.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 2 is a diagram of an example of a storage processor that is part of the system of FIG. 1, according to aspects of the disclosure;

DETAILED DESCRIPTION

Figure 1:
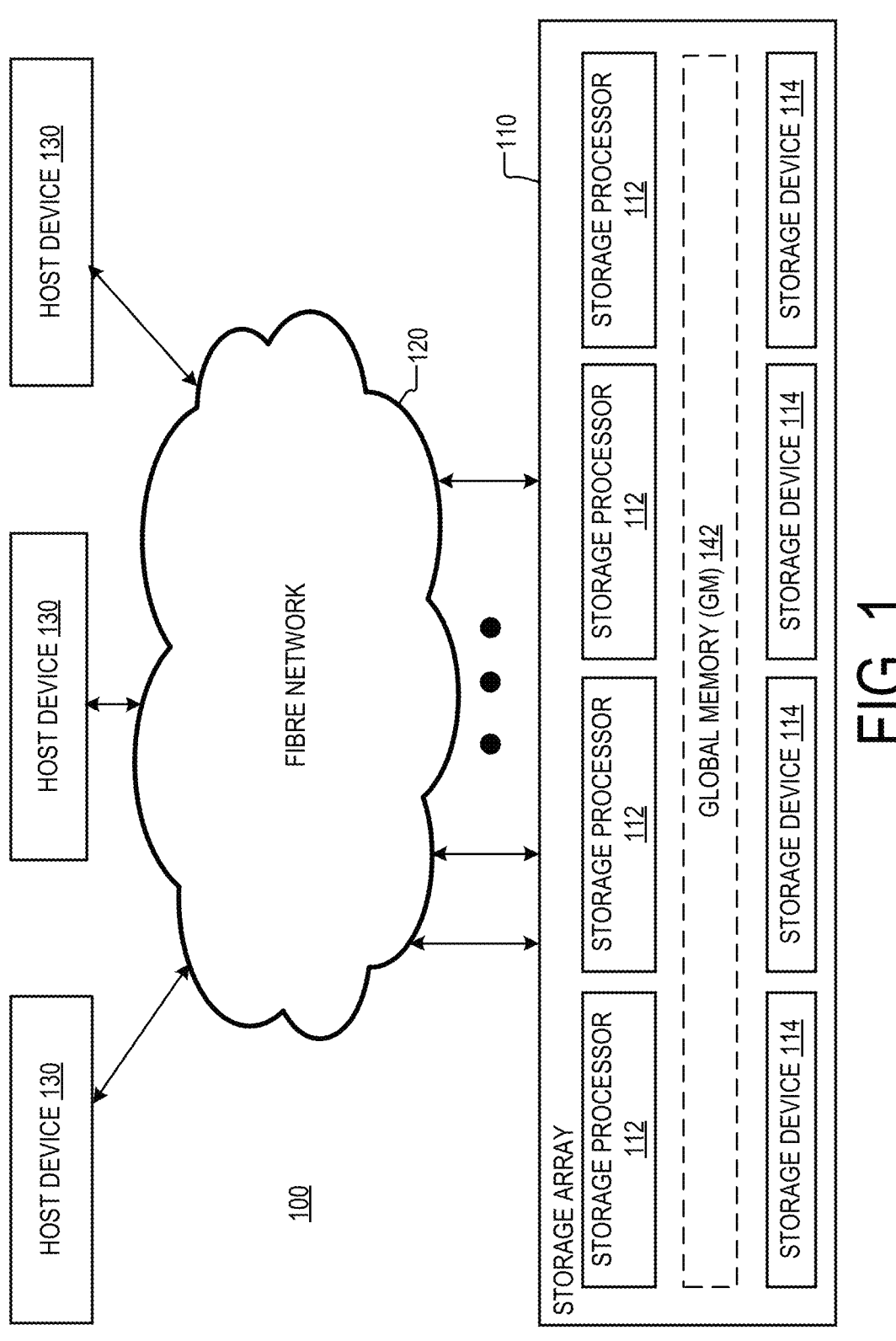
FIG. 1 is a diagram of an example of a system, according to aspects of the disclosure.

FIG. 1 is a diagram of an example of a system 100, according to aspects of the disclosure. As illustrated, system 100 may include a storage array 110, a communications network 120, and a plurality of host devices 130. According to the present example, network 120 includes a fibre channel (FC) network. Additionally or alternatively, in some implementations, the network 120 may include an InfiniBand network. Additionally or alternatively, in some implementations, the network 120 may include the Internet, a local area network (LAN), a wide area network (WAN), and/or any other suitable type of network. By way of example, any of the host devices 130 may include a desktop computer, a laptop, or a smartphone, for example. The storage array 110 may include a storage system, such as DELL/EMC Powermax™, DELL PowerStore™, and/or any other suitable type of storage system. The storage array 110 may include a plurality of storage processors 112 and a plurality of storage devices 114. According to the present example, the storage devices 114 may include solid state drives (SSDs). However, alternative implementations are possible in which another type of non-volatile storage device is used such as a hard disk (HD) for example. The present disclosure is not limited to using any specific storage device. The storage devices 114 may be organized in one or more Redundant Array of Independent Disks (RAID) groups. However, the present disclosure is not limited thereto.

The storage processors 112 may implement a global memory (GM) 142. GM 142 includes a memory space that is shared among the storage processors in storage array 110, and which is used for the caching of data. GM 142 may be formed by pooling, into the same address space, the memories of storage processors 112. Specifically, each of a plurality of memory portions may be pooled together. Each of the memory portions may be part of a different storage processor 112. Each of the memory portions, may be implemented by using physical memory hardware that is part of a different one of the storage processors 112. For example, each of the memory portions may be hosted (or otherwise implemented) with a different double data rate (DDR) random access memory (RAM) dual input memory module (DIMM).

FIG. 2 is a diagram of an example of a storage processor 112, according to aspects of the disclosure. As illustrated, storage processor 112 may include a memory 210, a processor 220, and a host bus adapter (HBA) 230. The memory 210 may include any suitable type of volatile and/or non-volatile memory, such as a solid-state drive (SSD), a hard disk (HD), a random-access memory (RAM), a Synchronous Dynamic Random-Access Memory (SDRAM), etc. The processor 220 may include any suitable type of processing circuitry, such as a general-purpose processor (e.g., an x86 processor, a MIPS processor, an ARM processor, etc.), a special-purpose processor, an application-specific integrated circuit (ASIC), a field programmable gate array (FPGA), etc. According to the present example, HBA 230 includes a Fibre Channel (FC) host bus adapter. However, in alternative implementations, HBA 230 may include an InfiniBand adapter, an Ethernet adapter, and/or any other suitable type of adapter.

Memory 210 may include a visible memory portion 214 and a local memory portion 216. The visible memory portion 214 is part of GM 142. The visible memory portion 214 may be accessible by any of the storage processors 112 in storage array 110. The visible memory portion 214 is accessible by using the addressing scheme that is practiced by the storage processors 112 for the purposes of accessing the GM 142. As such, the visible memory portions may be subject to access restrictions and synchronization schemes that control access to GM 142. The local memory portion 216 may be outside of GM 142, and it may fall outside of the reach of the access restrictions and synchronization schemes. The local memory portion 216 may be invisible and inaccessible to other storage processors 112 in storage array 110. The local memory portion 216 may be accessible only to the storage processor which contains the physical memory hardware that hosts the local memory portion 216 (i.e., the storage processor shown in FIG. 2).

Returning to FIG. 1, the network 120, as noted above, is a Fibre Channel network that implements data transmissions in accordance with the Fibre Channel Protocol (FCP). Each of the storage processors 112 may be configured to receive SCSI over FCP commands from the storage processors and execute those commands.

An example of a SCSI over FCP command is a command to write one or more files to storage devices 114. The SCSI over FCP command may originate from one of host devices 130. The one or more files are herein referred to as "user data" or "data item". The user data may be delivered to one of the storage processors 112 in a plurality of data frames (or another type of protocol data units), wherein each data frame includes a different portion of the user data. The user data may then be cached by the storage processors in the GM 142, after which the user data would be destaged into the storage devices 114. In any event, data that is written to storage devices 114 must be stored in GM 142 first.

Conventional storage systems use what is herein referred to as a "first data path" to route user data to global memory. The storage array 110 also uses the first data path. However, unlike conventional storage systems, storage array 110 also uses a second data path. In a nutshell, using the first data path involves routing user data to the global memory as the user data arrives at the storage processor, without waiting to confirm that the entire user data can be received successfully. By contrast, using the second data path involves routing the user data to local memory until the entire user data is received and stored in the user memory, confirming the integrity of the user data, and only if the integrity of the user data is validated, copying the user data from local memory to the global memory. In other words, when the second data path is used, the user data makes an extra stop in local memory (which is not made in the first data path).

Consider a SCSI write request to store one or more files (hereinafter "user data" or "data item") in the storage devices 114. The write request is generated by one of host devices 130. The write request is received by a given one of the storage processors 112. The user data is delivered in data frames. Each data frame includes a different portion of the user data (also referred to as a "data item portion"). In the present example, the user data is delivered in four data frames, which are labeled data frames 1-3. Each of data frames 1-3 contains a different portion of the user data (i.e., a different data item portion). Each of data frames 1-3 is transmitted to the given storage processor 112 via network 120.

Consider now an example in which the first data path is used by the given storage processor 112 to store the user data in GM 142. In this example, the given storage processor 112 receives data frame #1. Next, the given storage processor 112 extracts the data item portion that is contained in data frame #1. Next, the given storage processor 112 stores the extracted data item portion in GM 142. When the first data path is used, as in the present example, the extracted data item portion is stored in GM 142 before data frame #2 is received and/or before a successful transmission of the user data (to the given storage processor 112) has been ascertained by the given storage processor.

Next, the given storage processor 112 receives data frame #2. Next, the given storage processor 112 extracts the data item portion that is contained in data frame #2. Next, the given storage processor 112 stores the extracted data item portion in GM 142. When the first data path is used, as in the present example, the extracted data item portion is stored in GM 142 before data frame #3 is received and/or before a successful transmission of the user data (to the given storage processor 112) has been ascertained by the given storage processor. Next, the given storage processor 112 receives data frame #3. Next, the given storage processor 112 extracts the data item portion that is contained in data frame #3. Next, the given storage processor 112 stores the extracted data item portion in GM 142

Consider an example now in which the first data path is used and network 120 experiences a failure midway through the delivery of data frames 1-3. In this example, the data item portion contained in data frame #1 is already stored in GM 142, but data frames 2-3 never arrive, so a timeout event is generated that signals a failure of the transmission of the user data. Upon the generation of the timeout event, GM 142 is considered to have entered an inconsistent state (because it contains an incomplete file, etc.). Accordingly, the operation of GM 142 has to be suspended. This means that GM 142 has to be fenced off and rendered inaccessible by the storage processors 112 until it is brought back into a consistent state (e.g., by deleting the incomplete file and/or corresponding metadata, etc.). Stated succinctly, in the present example, the error in the transmission of the user data results in a reduced availability of GM 142. The present example is provided to illustrate the inherent threat that using the first data path poses to the availability of GM 142 during periods of unstable (or unavailable) network connection.

Consider now an example in which the second data path is used by the given storage processor 112 to store the user data in GM 142. In this example, the given storage processor 112 receives data frame #1. Next, the given storage processor 112 extracts the data item portion that is contained in data frame #1. Next, the given storage processor 112 stores the extracted data item portion in local memory portion 216. Next, the given storage processor 112 receives data frame #2. Next, the given storage processor 112 extracts the data item portion that is contained in data frame #2. Next, the given storage processor 112 stores the extracted data item portion in local memory portion 216. Next, the given storage processor 112 receives data frame #3. Next, the given storage processor 112 extracts the data item portion that is contained in data frame #3. Next, the given storage processor 112 stores the extracted data item portion in local memory portion 216. Next, the given storage processor 112 detects that the entire user data associated with the write request has been successfully received and stored in the local memory portion 216. And finally, upon confirming the integrity of the user data in local memory portion 216, the user data is copied from local memory portion 216 to GM 142. Copying the user data to GM 142 may include copying the user data from the local memory portion 216 to a visible memory portion 214 that is hosted by the given storage processor 112. However, the present disclosure is not limited to any specific method for copying user data from local memory portion 216 to GM 142—for example, the user data may be copied to sections of GM 142 that are hosted by other storage processors.

Notably, when the second data path is used, the user data is copied from local memory portion 216 to GM 142 only when the integrity of the user data is validated by the given storage processor, either explicitly or implicitly (e.g., validated implicitly by virtue of there being no errors and timeout events in the transmission of data frames 1-3). When the integrity of the user data cannot be validated and/or when a portion of the user data ends up not being received, the user data (or parts of the user data that are stored in the local memory portion 216) is not copied to GM 142.

Consider an example now in which the second data path is used and network 120 experiences a failure midway through the delivery of data frames 1-3. In this example, the data item portion contained in data frame #1 is already stored in local memory portion 216, but data frames 2-3 never arrive, so a timeout event is generated that signals a failure of the transmission of the user data. When the timeout event is considered to contain incomplete user data (or an incomplete data item). However, because no portion of the user data has been stored in GM 142 before the failure is detected, the operation of GM 142 is unaffected by the failure. The failure may be addressed locally by the given storage processor without affecting the operation of GM 142, which is not the case when the first data path is used. Stated succinctly, the present example is provided to illustrate that using the second data path in times of unstable network connection poses no threats to the availability of GM 142. Of course, using the second data path is less efficient because it requires the use of additional write operations.

Figure 3:
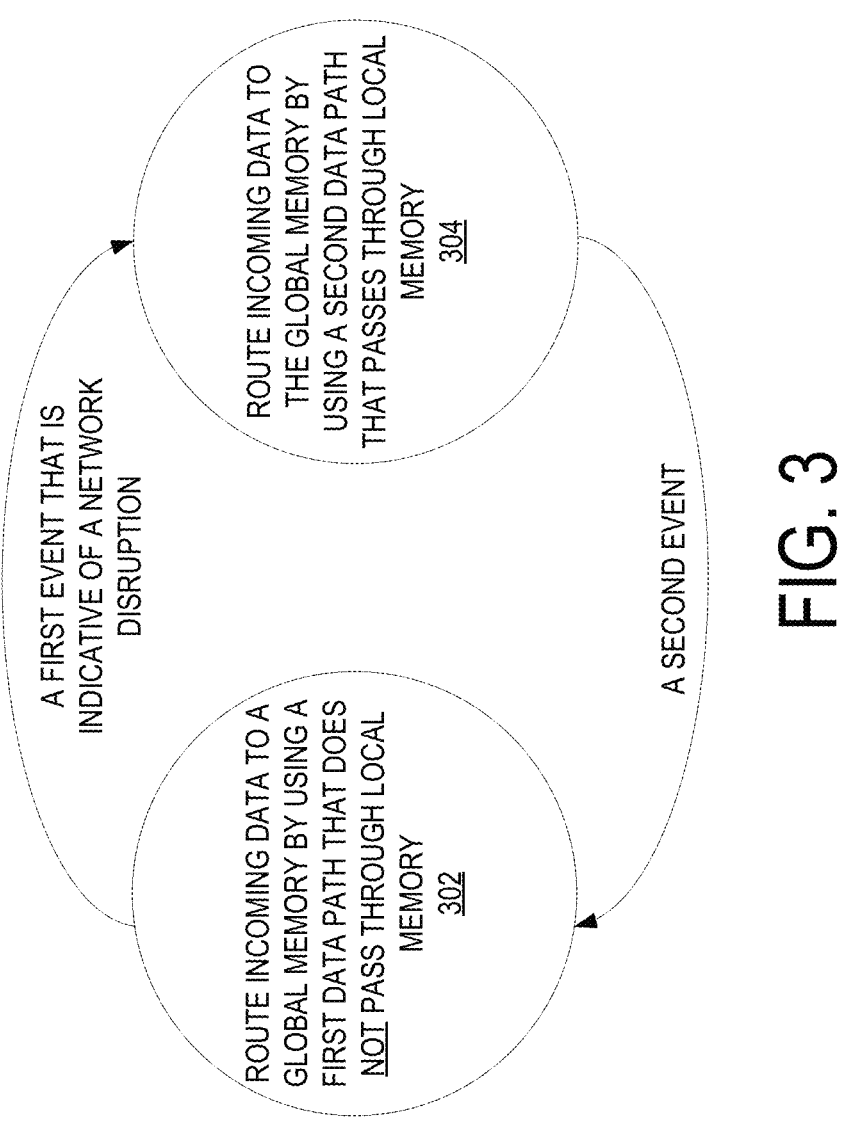
FIG. 3 is a state diagram illustrating aspects of the operation of the storage processor of FIG. 2, according to aspects of the disclosure.

FIG. 3 is a state diagram illustrating aspects of the operation of the given storage processor 112, according to one example. FIG. 3 is provided to illustrate that the given storage processor 112 may dynamically switch between using the first data path and the second data path for increased efficiency.

In the example of FIG. 3, the given storage processor 112 may be in one of a state 302 and a state 304. When in state 302, the given storage processor 112 may use the first data path to route incoming user data to GM 142. When in state 304, the given storage processor 112 may use the second data path to route user data to GM 142.

The given storage processor 112 may transition from state 302 to state 304 when a first event is detected by the given storage processor 112. The first event may be any event that signals that network 120 is unstable and/or signals that the connection between the given storage processor 112 and any of host devices 130 is unstable. In one example, the first event may be generated by storage processor 112 (and/or another device) in response to the receipt of a Fabric Performance Impact Notification (FPIN) message at the storage processor (or at the other device). As is known in the art, FPIN messages are used in computer networks, and particularly fabric-based networks or ethernet fabrics. FPIN messages may be generated by switches and other nodes that make up the computer networks. FPIN messages may contain information about latency, throughput, error rates, congestion, and other metric that affect network performance. FPIN messages are just one example of network signaling that that is indicative of network condition/state. The present disclosure is not limited to using any specific type of signaling to drive the transition between states 302 and 304, and vice versa.

In one example, the first event may be generated when the value of a network performance metric contained in a received FPIN message indicates that the performance of network 120 has deteriorated below a certain level. For example, the first event may be generated when a network latency value contained in a received FPIN message exceeds a predetermined threshold. As another example, the first event may be generated when a received FPIN message indicates that network 120 is congested. The first event may be generated by a first process in the given storage processor 112 (which monitors the signaling traffic of network 120). The first event may be sensed by a second process of the given storage processor 112 (which controls the switching between the first and second data paths). Alternatively, the first event may be generated by a device other than the given storage processor 112. The FPIN message, which triggers the generation of the first event, and thus triggers the switch from using the first data path to using the second data path by the given storage processor 112 may be received at the given storage processor 112 or another device that is part of the storage array 110. Although, in the present example, the first event is generated in response to an FPIN message, alternative implementations are possible in which the first event is generated in response to a different type of network signaling message (or any other message that contains information about the state of network 120).

In a nutshell, the first event may be generated when a deterioration in network conditions is detected, which could potentially cause the failure of the transmission of user data to the given storage processor 112. As noted above, a failure in the transmission of user data to the given storage processor 112, which occurs while the given storage processor is using the first data path to route the user data to GM 142, could bring GM 142 into an inconsistent state causing the GM 142 to become unavailable. In this regard, the switch from using the first data path to using the second data path, which is triggered by the first event, constitutes a preemptive action that aims to avoid a situation in which GM 142 is rendered unavailable.

The given storage processor 112 may transition from state 304 back to state 302 when a second event is detected by the given storage processor 112. The second event may be any event that signals that network 120 has become stable again and/or signals that the connection between the given storage processor 112 and any of host devices 130 has become again stable. In one example, the second event may be generated by storage processor 112 (and/or another device) in response to the receipt of a Fabric Performance Impact Notification (FPIN) message at the storage processor (or at the other device). Alternatively, in another example, the second event may be a timer event that is generated automatically after a certain period of time has passed since the generation of the most recent first event.

In one example, the second event may be generated when the value of a network performance message contained in a received FPIN message indicates that the performance of network 120 has improved above a certain level. For example, the second event may be generated when a network latency value contained in a received FPIN message is below a predetermined threshold. As another example, the second event may be generated when a received FPIN message indicates that network 120 is no longer congested. The second event may be generated by a first process in the given storage processor 112 (which monitors the signaling traffic of network 120) and sensed by a second process of the given storage processor 112 (which controls the switching between the first and second data paths). Alternatively, the second event may be generated by a device other than the given storage processor 112. The FPIN message, which triggers the generation of the second event, and thus triggers the switch from using the second data path to using the first data path, may be received at the given storage processor 112 or another device that is part of the storage array 110. Although, in the present example, the second event is generated in response to an FPIN message, alternative implementations are possible in which the first event is generated in response to a different type of network signaling message (or any other message that contains information about the state of network 120).

Figure 4:
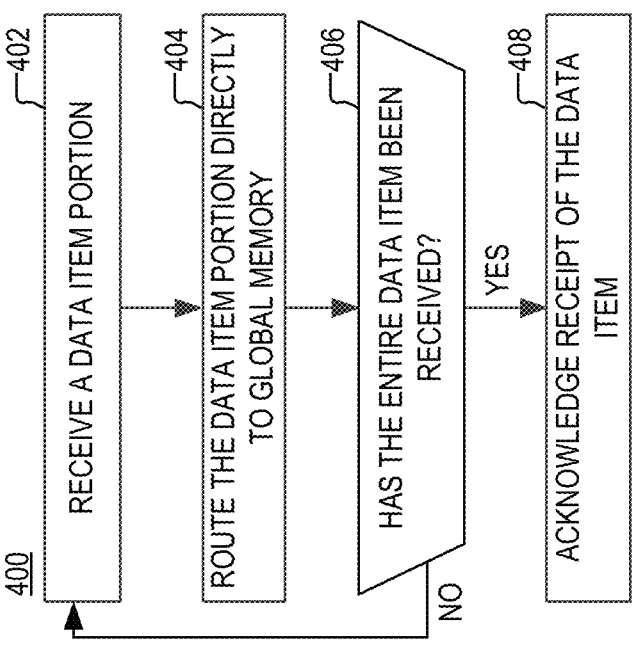
FIG. 4 is a flowchart of an example of a process, according to aspects of the disclosure.

FIG. 4 is a flowchart of an example of a process 400 for using the first data path to route incoming user data to GM 142, according to aspects of the disclosure. According to the present example, process 400 is performed when the given storage processor 112 is in state 302.

At step 402, the given storage processor 112 receives a data item portion. The data item portion may be received in a data frame, packet, and/or any other suitable type of protocol data unit. The data item portion may be part of a data item. The data item may be a body of user data. Specifically, the data item may include one or more files that are associated with a write request, and which are requested to be written to storage devices 114 by the write request. The write request may be a SCSI over FCP write request and/or any other suitable type of write request (e.g., a SCSI over IP or ATA request, etc.).

At step 404, the given storage processor 112 routes the data item directly to GM 142. Specifically, the given storage processor 112 may store the data item portion in GM 142 without waiting for the entire data item to be received at the given storage processor 112. In one example, the given storage processor 112 may write the data item portion to the visible memory portion 214 which is part of the given storage processor 112 (or to another part of GM 142 that is hosted in a different storage processor 112). In other words, the data item portion is copied to a memory location that is accessible by all (or more than one) of the storage processors 112.

At step 406, the given storage processor 112 determines if the entire data item has been received at the given storage processor 112. In other words, the given storage processor 112 determines if any portions of the data item remain to be received at the given storage processor 112. If the entire data item has been received, process 400 proceeds to step 408. Otherwise, process 400 returns to step 402 where another portion of the data item is received and processed in the same manner.

At step 408, the given storage processor 112 acknowledges the receipt of the data item. Acknowledging the receipt of the write request may include transmitting an ACK message indicating the data item and/or write request has been received successfully.

Figure 5:
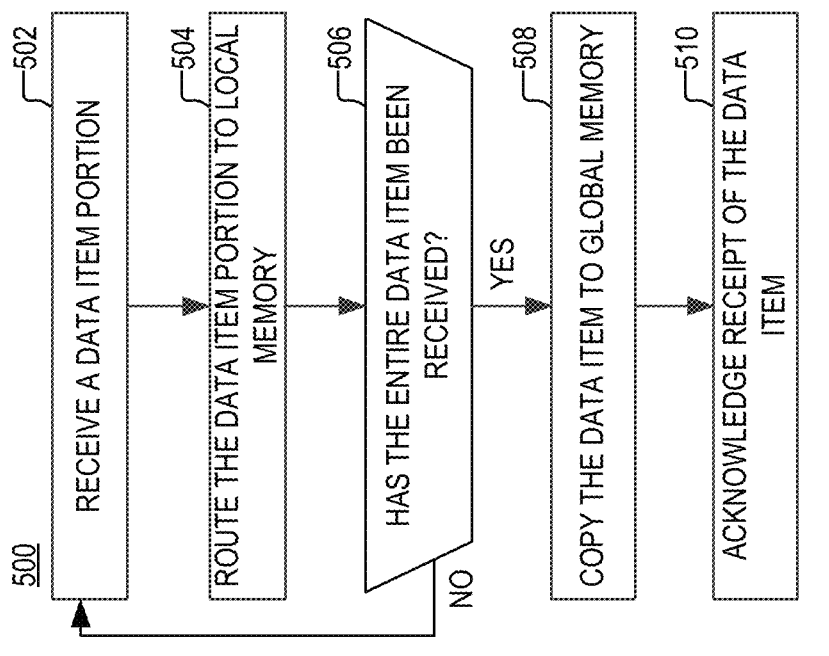
FIG. 5 is a flowchart of an example of a process, according to aspects of the disclosure.

FIG. 5 is a flowchart of an example of a process 500 for using the second data path to route incoming user data to GM 142, according to aspects of the disclosure. According to the present example, process 500 is performed when the given storage processor 112 is in state 304.

At step 502, the given storage processor 112 receives a data item portion. The data item portion may be received in a data frame, packet, and/or any other suitable type of protocol data unit. The data item portion may be part of a data item. The data item may be a body of user data. Specifically, the data item may include one or more files that are associated with a write request, and which are requested to be written to storage devices 114 by the write request. The write request may be a SCSI over FCP write request and/or any other suitable type of write request (e.g., a SCSI over IP or ATA request, etc.).

At step 504, the given storage processor 112 routes the data item to local memory. Specifically, the given storage processor 112 may store the data item portion in local memory portion 216. As noted above, local memory portion 216 may be hosted in physical memory hardware that is part of the given storage processor 112 and it may be inaccessible by any other storage processor 112 in storage array 110.

At step 506, the given storage processor 112 determines if the entire data item has been received at the given storage processor 112. In other words, the given storage processor 112 determines if any portions of the data item remain to be received at the given storage processor 112. If the entire data item has been received, process 500 proceeds to step 508. Otherwise, process 500 returns to step 502 where another portion of the data item is received and processed in the same manner.

At step 508, the given storage processor 112 copies the data item from the local memory of the given storage processor 112 to GM 142.

At step 510, the given storage processor 112 acknowledges the receipt of the data item. Acknowledging the receipt of the write request may include transmitting an ACK message indicating the data item and/or write request has been received successfully.

FIGS. 1-5 are provided as an example only. At least some of the steps discussed with respect to FIGS. 1-5 may be performed in parallel, in a different order, or altogether omitted. As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used herein, the terms "volume" and "data volume" are used interchangeably. The phrase "the local memory being separate of the global memory" means that the local memory and the global memory are part of different address spaces. The local memory and the global memory that are referenced by the phrase may or may not be implemented by using the same physical memory hardware (e.g., same DIMM, etc.). The acronym SCSI stands for "small computer system interface". The term "physical memory hardware" may refer to one or more memory modules (e.g, one or more DIMMs) or one or more memory chips.

Although the examples provided throughout the disclosure concern exchanges over a fibre channel network, the present disclosure is not limited to any specific type of network used. The term exchange may refer to any transmission of one or more data frames. The term "exchange number" may refer to any identifier that is used by both an HBA and the driver of HBA to track exchanges.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard. (1/23)

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system including a plurality of storage processors, the method comprising:

detecting, by a given one of the plurality of storage processors, a first event that is associated with a communications network, the communications network being arranged to deliver write requests to the storage processor, the first event being an event that signals a disruption or a possible disruption in the operation of the communications network;

in response to the first event, transitioning the given storage processor from a first state into a second state, the first state being a state in which data items associated with the write requests are routed to a global memory of the storage system via a first data path, the second state being state in which the data items are routed to the global memory via a second data path, wherein the global memory includes a plurality of global memory portions that are part of a same address space, wherein each global memory portion is implemented using physical memory hardware that is part of a different one of the plurality of storage processors, and wherein routing a first one of the data items via the first data path includes: receiving, by the given storage processor, a plurality of portions of the first data item; and storing, by the given storage processor, each of the plurality of portions of the first data item in the global memory, at least some of the plurality of portions of the first data item being stored in the global memory before the entire first data item is successfully transferred to the given storage processor.

2. The method of claim 1, wherein the communications network includes a Fibre Channel network and the first event is a Fabric Performance Impact Notification (FPIN) event.

3. The method of claim 1, wherein routing a second one of the data items via the second data path includes:

receiving, by the given storage processor, a plurality of portions of the second data item and storing each of the plurality of portions of the second data item in a local memory of the given storage processor, the local memory being separate of the global memory; and after the entire second data item has been successfully stored in the local memory, copying, by the given storage processor, the plurality of portions of the second data item from the local memory to the global memory, wherein the global memory is accessible by each of the plurality of storage processors and the local memory is accessible only by the given storage processor.

4. The method of claim 3, wherein the local memory is hosted on physical memory hardware that is part of the given storage processor.

5. The method of claim 1, further comprising detecting a second event and transitioning the given storage processor from the second state back to the first state.

6. The method of claim 5, wherein the second event includes a timer event or a network signaling event.

7. A storage processor, comprising:

physical memory hardware; and at least one processor that is operatively coupled to the physical memory hardware, the at least one processor being configured to perform the operations of:

detecting a first event that is associated with a communications network, the communications network being arranged to deliver write requests to the storage processor, the first event being an event that signals a disruption or a possible disruption in the operation of the communications network;

in response to the first event, transitioning the storage processor from a first state into a second state, the first state being a state in which data items associated with the write requests are routed to a global memory of a storage system via a first data path, the second state being a state in which the data items are routed to the global memory via a second data path, wherein the storage processor is part of a plurality of storage processors that constitute the storage system, and wherein the global memory includes a plurality of global memory portions that are part of a same address space, wherein each global memory portion is implemented using physical memory hardware that is part of a different one of the plurality of storage processors, and wherein routing a first one of the data items via the first data path includes: receiving a plurality of portions of the first data item; and storing each of the plurality of portions of the first data item in the global memory, at least some of the plurality of portions of the first data item being stored in the global memory before the entire first data item is successfully transferred to the storage processor.

8. The storage processor of claim 7, wherein the communications network includes a Fibre Channel network and the first event is a Fabric Performance Impact Notification (FPIN) event.

9. The storage processor of claim 7, wherein routing a second one of the data items via the second data path includes:

receiving a plurality of portions of the second data item and storing each of the plurality of portions of the second data item in a local memory, the local memory being separate of the global memory; and after the entire second data item has been successfully stored in the local memory, copying the plurality of portions of the second data item from the local memory to the global memory, wherein the global memory is accessible by each of the plurality of storage processors and the local memory is accessible only by the at least one processor.

10. The storage processor of claim 9, wherein the local memory is hosted on the physical memory hardware.

11. The storage processor of claim 7, further comprising detecting a second event and transitioning the storage processor from the second state back to the first state.

12. The storage processor of claim 11, wherein the second event includes a timer event or a network signaling event.

13. A non-transitory computer-readable medium storing one or more processor-executable instructions, which, when executed by a processing circuitry of a given one of a plurality of storage processors in a storage system, causes the processing circuitry to perform the operations of:

detecting a first event that is associated with a communications network, the communications network being arranged to deliver write requests to the given storage processor, the first event being an event that signals a disruption or a possible disruption in the operation of the communications network;

in response to the first event, transitioning the given storage processor from a first state into a second state, the first state being a state in which data items associ- [5] ated with the write requests are routed to a global memory of the storage system via a first data path, the second state being a state in which the data items are routed to the global memory via a second data path, wherein the global memory includes a plurality of global [10] memory portions that are part of a same address space, wherein each global memory portion is implemented using physical memory hardware that is part of a different one of the plurality of storage processors, and [15] wherein routing a first one of the data items via the first data path includes: receiving by the given storage processor, a plurality of portions of the first data item; and storing, by the given storage processor, each of the plurality of portions of the first data item in the global [20] memory, at least some of the plurality of portions of the first data item being stored in the global memory before the entire first data item is successfully transferred to the given storage processor.

14. The non-transitory computer-readable medium of claim 13, wherein the communications network includes a Fibre Channel network and the first event is a Fabric Performance Impact Notification (FPIN) event.

15. The non-transitory computer-readable medium of claim 13, wherein routing a second one of the data items via the second data path includes:

receiving, by the given storage processor, a plurality of portions of the second data item and storing each of the plurality of portions of the second data item in a local memory of the given storage processor, the local memory being separate of the global memory; and after the entire second data item has been successfully stored in the local memory, copying, by the given storage processor, the plurality of portions of the second data item from the local memory to the global memory, wherein the global memory is accessible by each of the plurality of storage processors and the local memory is accessible only by the given storage processor.

16. The non-transitory computer-readable medium of claim 15, wherein the local memory is hosted on physical memory hardware that is part of the given storage processor.

17. The non-transitory computer-readable medium of claim 13, further comprising detecting a second event and transitioning the given storage processor from the second state back to the first state.

* * * * *